(12) United States Patent
Lee et al.

(10) Patent No.: US 9,117,276 B2
(45) Date of Patent: Aug. 25, 2015

(54) METHOD AND SYSTEM FOR CORRECTION OF OPTICAL SATELLITE IMAGE

(71) Applicant: KOREA METEOROLOGICAL ADMINISTRATION, Seoul (KR)

(72) Inventors: Chang Wook Lee, Seoul (KR); Min Ji Cho, Seoul (KR); Zhong Lu, Vancouver, WA (US); Young Jean Choi, Seoul (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 17 days.

(21) Appl. No.: 13/995,293

(22) PCT Filed: Apr. 15, 2013

(86) PCT No.: PCT/KR2013/003131
§ 371 (c)(1),
(2) Date: Jun. 18, 2013

(87) PCT Pub. No.: WO2014/157764
PCT Pub. Date: Oct. 2, 2014

(65) Prior Publication Data
US 2014/0301660 A1    Oct. 9, 2014

(51) Int. Cl.
*G06K 9/32* (2006.01)
*G06T 5/00* (2006.01)
*G06T 5/50* (2006.01)

(52) U.S. Cl.
CPC . *G06T 5/005* (2013.01); *G06T 5/50* (2013.01); *G06T 2207/10036* (2013.01); *G06T 2207/20221* (2013.01)

(58) Field of Classification Search
USPC ......... 382/154, 164, 167, 173, 275, 284, 300; 455/12.1, 13.1, 13.2, 427; 244/158, 244/173, 176; 342/52, 357; 398/118, 129; 701/13
See application file for complete search history.

(56) References Cited

U.S. PATENT DOCUMENTS

| 5,465,170 A | * | 11/1995 | Arimoto | ........................ 398/129 |
| 5,979,830 A | * | 11/1999 | Kellermeier | ............... 244/158.8 |
| 7,379,673 B2 | * | 5/2008 | Krill et al. | ..................... 398/118 |
| 2014/0191894 A1 | * | 7/2014 | Chen et al. | ....................... 342/52 |

FOREIGN PATENT DOCUMENTS

| KR | 1020020054215 A | 7/2002 |
| KR | 1020050054673 A | 6/2005 |

OTHER PUBLICATIONS

International Search Report dated Sep. 12, 2013 issued in International Application No. PCT/KR2013/003131.
(Continued)

*Primary Examiner* — Amir Alavi
(74) *Attorney, Agent, or Firm* — Scully, Scott, Murphy & Presser, P.C.

(57) ABSTRACT

Provided are a method and a system for the correction of an optical satellite image, the method including: a first step in which a satellite image judgment unit inputs and receives a plurality of satellite images divided according to spectral information and judges whether or not some area is a missing satellite image; a second step in which when the satellite image judgment unit judges that the some areas is the missing satellite images, a first interpolation unit inputs and receives the plurality of satellite images and carries out one-dimensional interpolation for each satellite image; a third step in which a second interpolation unit carries out two-dimensional interpolation for each satellite image in which the one-dimensional interpolation is carried out; and a fourth step in which a satellite image composing unit composes a corrected satellite image by gathering each satellite image in which the two-dimensional interpolation is carried out.

16 Claims, 3 Drawing Sheets

(56) References Cited

OTHER PUBLICATIONS

Kim, Won-Hee et al., "Satellite Image Reconstruction Using Low Level Interpolation and Loss Information Estimation", 2009, Dept. of Computer Multimedia Engineering, PuKyong Nat'l Univ., pp. 331-336, together with English Abstract.

* cited by examiner

METHOD AND SYSTEM FOR CORRECTION OF OPTICAL SATELLITE IMAGE

CROSS-REFERENCE TO RELATED APPLICATION

This application is a 371 of PCT/KR2013/003131 filed on Apr. 15,2013.

This application claims priority to Korean Patent Application No. 10-2013-0033580, filed on Mar. 28, 2013, in the Korean Intellectual Property Office, the entire contents of which are hereby incorporated by reference.

BACKGROUND OF THE INVENTION

1. Field of the Invention

The present invention relates to a method and a system for the correction of an optical satellite image, and more specifically, to a method and a system for the correction of an optical satellite image which can correct satellite images in which pixel loss occurs.

2. Description of the Related Arts

Starting from No. 1 in 1972, Landsat, which is the first private remote sensing satellite for earth observation, was launched up to No. 7 in April, 1999, and only No. 5 and No. 7 have been currently operated.

As Landsat's satellite images accumulated for 40 years were distributed at no cost from the USGS of U.S.A., the satellite images have been globally widely used. However, the operation of a SLC (Scan Line Corrector) of Landsat 7 ETM+ (Enhanced Thematic Mapper Plus) stopped on May 31, 2003. Thus, as illustrated in (a) of FIG. 1, a defect that spectral information of about 25% of the images is not obtained was generated.

Thus, although Landsat 7 ETM+ enables earth observation to be easily performed with two times improved resolution than conventional sensors, the most users have used only images obtained before May 31, 2003.

To carry out continuous researches, NASA launched Landsat 8 on Feb. 11, 2013, but optical satellite images, which have been distributed at no cost from June 2003 up to date, are only Landsat 7 ETM+ images. Accordingly, researches for solving a SLC-off phenomenon has been steadily carried out all over the world.

However, restoration is complicated in processes and an enough interpolation method to carry out investigations has not been yet developed. Due to this, the images obtained after May 31, 2003 have been used in researches in a state of vacuums thereof being not restored. General users or companies also have much difficulty in utilizing the Landsat 7 ETM+ satellite images.

In the past, to solve the SLC-off phenomenon of Landsat 7 ETM+, a method of correcting omitted data areas by utilizing images obtained from the TM (Thematic Mapper) of Landsat 5 or SLC-on images captured around the same time, or other satellite images of similar spectrometric zones was used.

Such a method is advantageous that relative spectral information compared to performing interpolating within a single image can be obtained, but is disadvantageous that to restore one image, another image is required.

Also, when the irregular distribution of clouds or ground surface covering is changed, optical images are restored with wrong spectral information. Furthermore, since the optical images are greatly influenced by clouds, it would be very difficult to obtain an image not having the clouds at the time when the user desires.

As another conventional method, there is a method of filling in loss areas through interpolation using pixel values around loss areas within a single image.

Such a conventional interpolation method is advantageous that the interpolation could be performed within the single image. However, it is difficult to correct the loss areas, which reach a maximum of 13 pixels, using only the interpolation method. In a case where two-dimensional interpolation is performed, as illustrated in (b) of FIG. 1, a case in which the spreading of interpolated images occurs or spectral information having a large difference in peripheral pixel value is input is generated.

Due to this defect, the method of filling in the vacuums of the image to restore the image by utilizing the satellite image having the similar spectral zone and captured around the same time has been mainly used. Also, in Landsat images provided from the USGS, eight kinds of spectral information sources have been distributed in a GEOTIFF format, respectively. This interpolation process is problematic that it is very inconvenient and takes a long time to handle dozens or hundreds of data sources with commercial software.

SUMMARY OF THE INVENTION

The present invention has been made keeping in mind the above problems occurring in the related art. An aspect of the present invention provides a method and a system for the correction of an optical satellite image, which is more improved by carrying out one-dimensional interpolation and two-dimensional interpolation for satellite images in which pixel loss occurs.

Another aspect of the present invention provides a method and a system for the correction of an optical satellite image which can more conveniently handle a large amount of satellite images using satellite information or satellite sensor information.

According to an aspect of the present invention, there is provided a method for the correction of an optical satellite images, including: a first step in which a satellite image judgment unit inputs and receives a plurality of satellite images divided according to spectral information and whether or not some area is a missing satellite image; a second step in which when the satellite image judgment unit judges that the some area is the missing satellite image, a first interpolation unit inputs and receives the plurality of satellite images, and carries out one-dimensional interpolation for each satellite image which is input and received; a third step in which a second interpolation unit carries out two-dimensional interpolation for each satellite image in which the one-dimensional interpolation is carried out; and a fourth step in which a satellite image composing unit composes a corrected satellite image by gathering each satellite image in which the two-dimensional interpolation is carried out.

According to one exemplary embodiment of the present invention, the second step may be performed in such a matter that the first interpolation unit carries out one-dimensional interpolation for a missing pixel using normal pixels on a Y-axis on the basis of the missing pixels in the satellite images which are input and received.

According to another exemplary embodiment of the present invention, the second step may be performed in such a manner that the first interpolation unit carries out one-dimensional interpolation by carrying out cubic convolution targeting the normal pixels on the Y-axis based on the missing pixel in the satellite images, which are input and received, to calculate the missing pixels.

According to still another exemplary embodiment of the present invention, the third step may be performed in such a manner that the second interpolation unit carries out two-dimensional interpolation for the missing pixel using the normal pixels of a predetermined range on the basis of the missing pixel in the satellite images which are input and received.

According to still another exemplary embodiment of the present invention, the third step may be performed in such a manner that the second interpolation unit carries out two-dimensional interpolation by calculating an average targeting the normal pixels of the predetermined range on the basis of the missing pixel in the satellite images in which the one-dimensional interpolation is carried out, and calculating the missing pixel.

According to still another exemplary embodiment of the present invention, the first step may further include a step in which when the satellite image judgment unit distinguishes a satellite providing the satellite images which are input and received from a sensor of the satellite and judges the satellite images provided from the sensor and the satellite providing non-missing satellite images, the satellite image composing unit gathers the plurality of satellite images divided according to the spectral information and composes a non-corrected satellite image.

According to still another exemplary embodiment of the present invention, the sensor of the satellite is composed of any one of a MSS (Multi Scanner System), a TM (Thematic Mapper), and ETM+ (Enhanced Thematic Mapper Plus).

According to still another exemplary embodiment of the present invention, the method for the correction of satellite image may further include, after the fourth step, a step in which the satellite image composing unit composes a database using the corrected satellite image and the non-corrected satellite image.

According to another aspect of the present invention, there is provided a system for the correction of an optical satellite image, including: a satellite image judgment unit which inputs and receives a plurality of input satellite images divided according to spectral information and which judges whether or not some area is a missing satellite image; a first interpolation unit which carries out one-dimensional interpolation for each input satellite image by inputting and receiving the plurality of satellite images when the satellite image judgment unit judges that the some area is the missing satellite images; a second interpolation unit which carries out two-dimensional interpolation for each satellite image in which the one-dimensional interpolation is carried out; and a satellite image composing unit which composes a corrected satellite image by gathering each satellite image in which the two-dimensional interpolation is carried out.

According to one exemplary embodiment of the present invention, the first interpolation unit carries out one-dimensional interpolation for missing pixels using normal pixels on a Y-axis on the basis of the missing pixels in the satellite images which are input and received.

According to another exemplary embodiment of the present invention, the first interpolation unit carries out one-dimensional interpolation by carrying out cubic convolution targeting the normal pixels on the Y-axis on the basis of the missing pixels in the satellite images which are input and received and calculating the missing pixels.

According to still another exemplary embodiment of the present invention, the second interpolation unit carries out two-dimensional interpolation for the missing pixel using the normal pixels of a predetermined range on the basis of the missing pixel in the satellite images in which the one-dimensional interpolation is carried out.

According to still another exemplary embodiment of the present invention, the second interpolation unit carries out two-dimensional interpolation by calculating an average targeting the normal pixels of the predetermined range on the basis of the missing pixel in the satellite images in which the one-dimensional interpolation is carried out, and calculating the missing pixel.

According to still another exemplary embodiment of the present invention, the satellite image composing unit composes a non-corrected satellite image by gathering the plurality of satellite images divided according to the spectral information when the satellite image judgment unit distinguishes the satellite providing the input satellite images from the sensor of the satellite and judges the satellite images provided from the satellite providing the non-missing satellite images and from the sensor.

According to still another exemplary embodiment of the present invention, the sensor of the satellite is composed of any one of a MSS (Multi Scanner System), a TM (Thematic Mapper), ETM+ (Enhanced Thematic Mapper Plus).

According to still another exemplary embodiment of the present invention, the system may further include a database which stores the corrected satellite image and non-corrected satellite image composed by the satellite image composing unit.

According to the present invention, the more improved method and system for the correction of optical satellite images can be provided by carrying out the one-dimensional interpolation and two-dimensional interpolation for the satellite images in which the pixels are missing.

Also, according to the present invention, a large amount of satellite images can be more conveniently handled using the information of the satellite and satellite sensor.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE INVENTION

Figure 1:
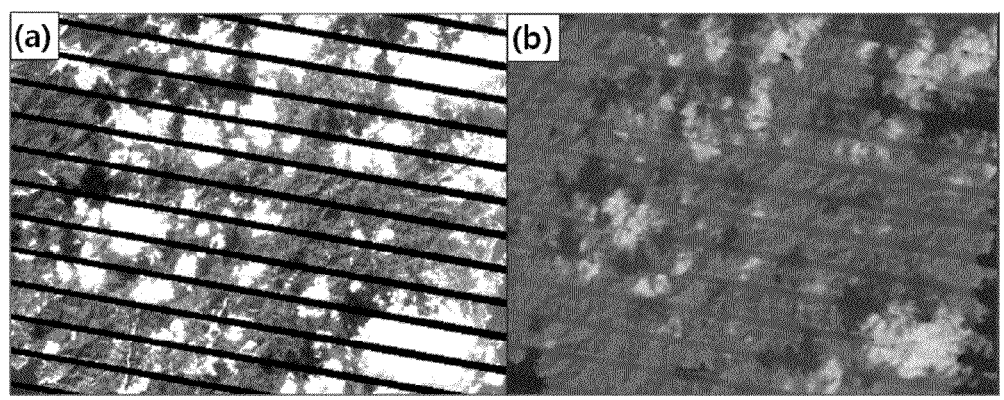
FIG. 1 is a view illustrating a satellite image before correction and a satellite image after correction according to a conventional art.

Hereinafter, preferred embodiments of the present invention will be described in detail with reference to the accompanying drawings. The present invention may, however, be embodied in different forms and should not be construed as limited to the embodiments set forth herein. The embodiments of the present invention are provided to more specifically explain the present invention to those having ordinary skill in the art to which the present invention pertains. Accordingly, it should be understood that the shape and size of the elements shown in the drawings may be exaggeratedly drawn to provide an easily understood description of the structure of the present invention rather than reflecting the actual sizes of the corresponding elements.

Figure 2:
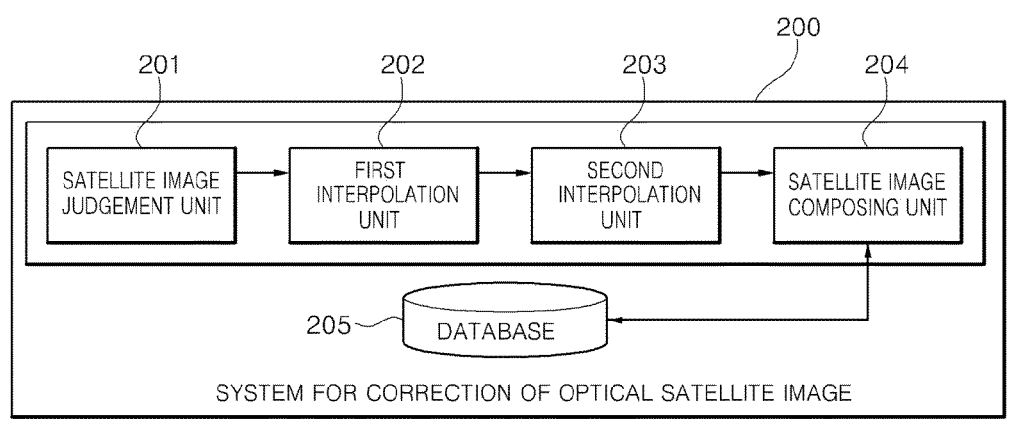
FIG. 2 is a block diagram showing a system for the correction of an optical satellite image according to one exemplary embodiment of the present invention.
Figure 3:
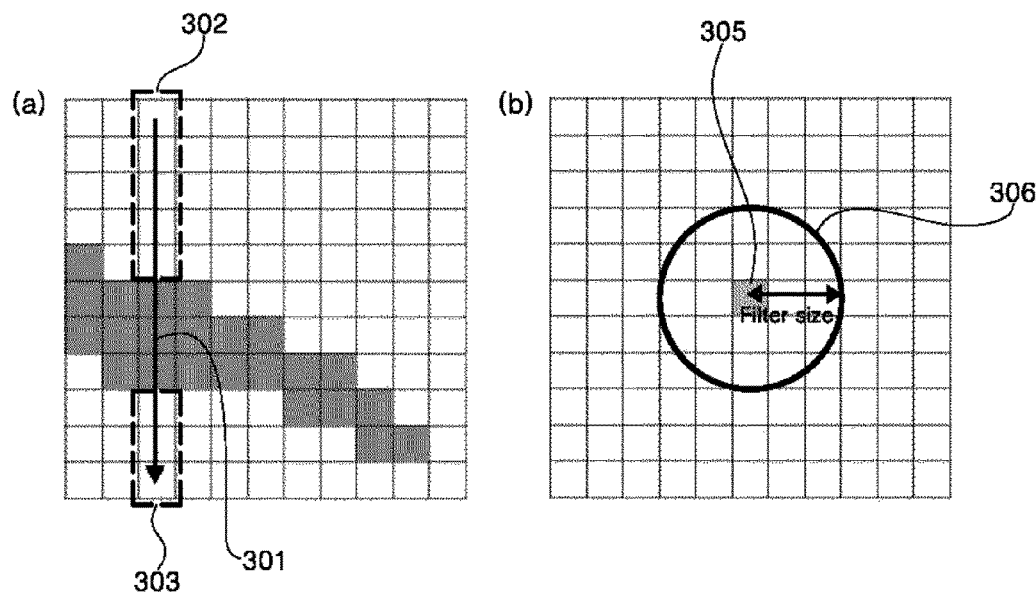
FIG. 3 is a view for explaining a first interpolation method and a second interpolation method according to another exemplary embodiment of the present invention.
Figure 4:
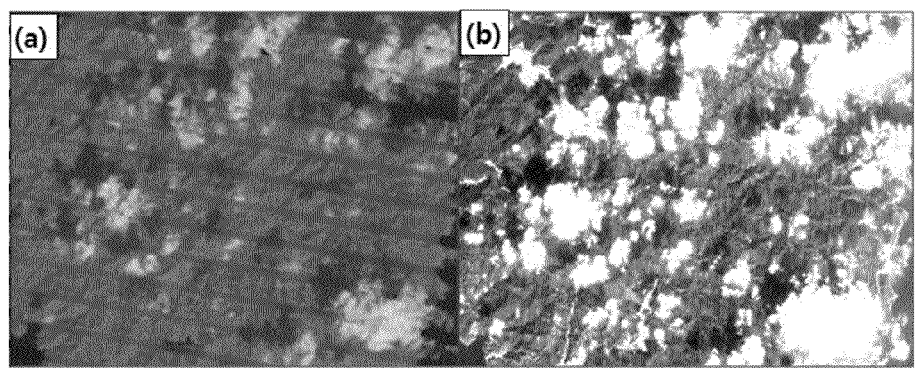
FIG. 4 is a view illustrating a satellite image before correction and a satellite image after correction according to still another exemplary embodiment of the present invention.

FIG. 2 is a block diagram showing a system for the correction of optical satellite images according to one exemplary embodiment of the present invention, FIG. 3 is a view for explaining a first interpolation method and a second interpolation method according to another exemplary embodiment of the present invention, and FIG. 4 is a view illustrating a satellite image before correction and a satellite image after correction according to still another exemplary embodiment of the present invention.

A system for the correction of an optical satellite image according to exemplary embodiments is explained with reference to FIG. 2 to FIG. 4, As illustrated in FIG. 2, a system for the correction of an optical satellite image according to one exemplary embodiment includes: a satellite image judgment unit 201; a first interpolation unit 202; a second interpolation unit 203; a satellite image composing unit 204; and a database 205.

The satellite image judgment unit 201 inputs and receives a plurality of satellite images divided according to spectral information and judges whether or not some area is a missing satellite image.

(a) of FIG. 4 illustrates a satellite image in which the part of the areas is missed.

When the satellite image judgment unit 201 judges that some area areas is the missing satellite image, the first interpolation unit 202 inputs and receives the plurality of satellite images and performs one-dimensional interpolation for each satellite image which is input and received.

At this time, the satellite images which the first interpolation unit 202 inputs and receives may be images obtained from Landsat 7 ETM+ (Enhanced Thematic Mapper Plus), and the Landsat 7 provides images having spectral information of about 25% of the images as the operation of an SLC (Scan Line Corrector) of EMT+ (Enhanced Thematic Mapper Plus) stops.

TABLE 1

| Mounted Sensor | Spectral Information | | Spatial Resolution |
|---|---|---|---|
| MSS | Band 1 | 0.50-0.60 μm | 80 m |
|  | Band 2 | 0.60-0.70 μm | 80 m |
|  | Band 3 | 0.70-0.80 μm | 80 m |
|  | Band 4 | 0.80-1.10 μm | 80 m |
| TM | Band 1 | 0.45-0.52 μm | 30 m |
|  | Band 2 | 0.52-0.60 μm | 30 m |
|  | Band 3 | 0.63-0.69 μm | 30 m |
|  | Band 4 | 0.76-0.90 μm | 30 m |
|  | Band 5 | 1.55-1.75 μm | 30 m |
|  | Band 6 | 10.4-12.5 μm | 60 m |
|  | Band 7 | 2.08-2.35 μm | 30 m |
| ETM+ | Band 1 | 0.450-0.520 μm | 30 m |
|  | Band 2 | 0.520-0.600 μm | 30 m |
|  | Band 3 | 0.630-0.690 μm | 30 m |
|  | Band 4 | 0.760-0.900 μm | 30 m |
|  | Band 5 | 1.550-1.750 μm | 30 m |
|  | Band 6 | 10.40-12.50 μm | 60 m |
|  | Band 7 | 2.080-2.350 μm | 30 m |
|  | Panchromatic Band | 0.520-0.900 μm | 15 m |

At this time, as shown in Table 1 above, the spectral information obtained from Landsat 7 ETM+ is divided into seven bands according to each wavelength. The first interpolation unit 202 inputs and receives seven satellite images divided into the spectral information source according to each band.

The first interpolation unit 202 carries out one-dimensional interpolation for each satellite image which is input and received.

That is, the first interpolation unit 202 carries out the one-dimensional interpolation for the respective satellite images according to the spectral information.

At this time, as illustrated in (a) of FIG. 3, when carrying out the one-dimensional interpolation, the first interpolation unit 202 may carry out the one-dimensional interpolation for a missing pixel 301 using normal pixels 302, 303 on a Y axis on the basis of the missing pixel 301 in each satellite image according to the spectral information.

More specifically, the first interpolation unit 202 may perform one-dimensional interpolation by carrying out cubic convolution targeting the normal pixels 302, 303 on the Y axis on the basis of the missing pixel 301 in the satellite images which are input and received and calculating the missing pixel 301.

Also, the second interpolation unit 203 carries out two-dimensional interpolation for the satellite images in which each one-dimensional interpolation is carried out according to the spectral information.

At this time, as illustrated in b of FIG. 3, when carrying out two-dimensional interpolation, the second interpolation unit 203 may carry out two-dimensional interpolation for a missing pixel 305 using the normal pixels within a predetermined range 306 on the basis of the missing pixel 305 in the satellite images in which the one-dimensional interpolation is carried out.

Explaining it more specifically, the second interpolation unit 202 may carry out the two-dimensional interpolation by calculating an average targeting the normal pixels of the predetermined range 306 on the basis of the missing pixel 305 in the satellite images in which the one-dimensional interpolation is carried out, and calculating the missing pixel 305.

The satellite image composing unit 204 composes a corrected satellite image as illustrated in (b) of FIG. 4 by gathering each satellite image in which the two-dimensional interpolation is carried out and stores it in the database 205.

Referring to (b) of FIG. 4, comparing the corrected satellite image with a satellite image before correction illustrated in (a) of FIG. 4, it could be confirmed that the correction result correction is very excellent. Also, comparing the conventional correction result of (b) of FIG. 3 with it, it could be confirmed that there is a remarkable difference between the correction results.

Meanwhile, the satellite image composing unit 204 functions to compose the database 205 using the images obtained according to sensors of each satellite except for functioning to gather the interpolated images as described above.

That is, when the satellite image composing unit 204 distinguishes the satellite providing the satellite images which are input and received from the sensor of the satellite and thus judges the satellite images provided from the sensor and the satellite providing non-missing satellite images, the satellite image composing unit 204 composes the non-corrected satellite image by gathering the plurality of satellite images divided according to the spectral information, and composes the database 205 using the non-corrected satellite image.

Explaining it more specifically, when the satellite image judgment unit 201 judges satellite images obtained from the MSS (Multi Scanner System) of Landsat 1, 2 or 3, the satellite image composing unit 204 may compose a first non-corrected satellite image by gathering the plurality of satellite images divided according to the spectral information.

When the satellite image judgment unit 201 judges satellite images obtained from the TM (Thematic Mapper) of Landsat 4 or 5, the satellite imagecomposing unit 204 may compose a second non-corrected satellite image by gathering the plurality of satellite images divided according to the spectral information. When the satellite image judgment unit 201 judges non-missing satellite images obtained from Landsat 7 ETM+ (Enhanced Thematic Mapper Plus), the satellite image composing unit 204 may compose a third non-corrected satellite image by gathering the plurality of satellite images divided according to the spectral information.

At this time, it is preferable that the satellite image composing unit 204 stores each satellite image in the database 205 in a parameter file which is legible in ERDAS software after reading each satellite image with a Matlab program and storing it in a BIL format.

Figure 5:
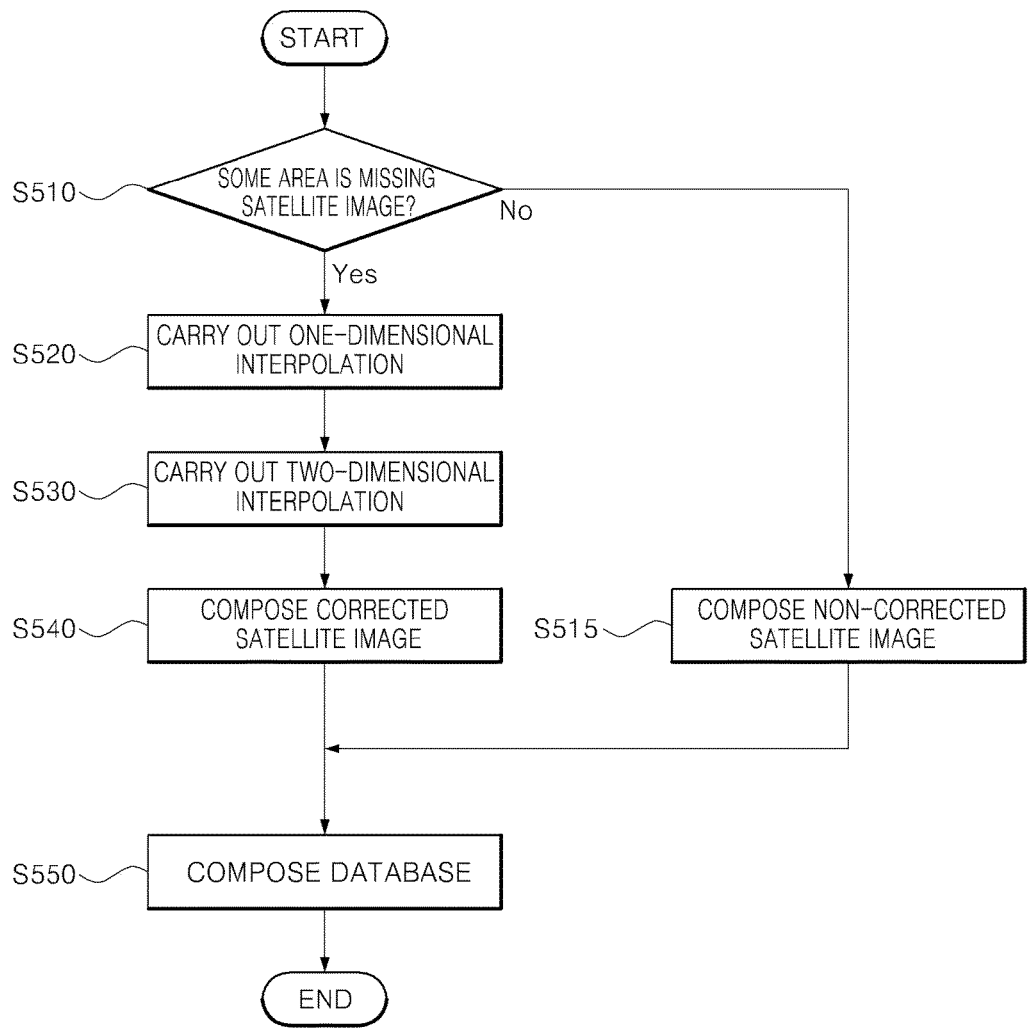
FIG. 5 is a flow chart for explaining a method for the correction of an optical satellite image according to still another exemplary embodiment of the present invention.

FIG. 5 is a flow chart for explaining a method for the correction of an optical satellite image according to still another exemplary embodiment of the present invention.

A method for the correction of an optical satellite image according to the present exemplary embodiment of the invention will be explained with reference to FIG. 5.

The satellite image judgment unit inputs and receives the plurality of satellite images divided according to the spectral information and judges whether or not some area is a missing satellite image (S510).

When the satellite image judgment unit judges that the some area is the missing satellite image, the first interpolation unit inputs and receives the plurality of satellite images and carries out one-dimensional interpolation for each satellite image which is input and received (S520).

At this time, the satellite images which the first interpolation unit inputs and receives may be images obtained from Landsat 7 ETM+ (Enhanced Thematic Mapper Plus), and the Landsat 7 provides images having spectral information of about 25% of the images as the operation of an SLC (Scan Line Corrector) of EMT+ (Enhanced Thematic Mapper Plus) stops.

At this time, as shown in Table 1 above, the spectral information of the satellite images obtained from Landsat 7 ETM+ is divided into seven bands according to each wavelength. The first interpolation unit may input and receive seven satellite images divided into the spectral information according to each band.

The first interpolation unit 202 may carry out one-dimensional interpolation by carrying out cubic convolution targeting the normal pixels 302, 303 on the Y axis on the basis of the missing pixel 301 in the satellite images which are input and received, and calculating the missing pixel 301.

After this, the second interpolation unit carries out two-dimensional interpolation for the satellite images in which each one-dimensional interpolation is carried out according to the spectral information (S530).

Explaining it more specifically, the second interpolation unit may perform the two-dimensional interpolation by calculating an average targeting the normal pixels of the predetermined range 306 on the basis of the missing pixel 305 in the satellite images in which the one-dimensional interpolation is carried out, and calculating the missing pixel 305.

The satellite image composing unit 204 composes the corrected satellite image as illustrated in (b) of FIG. 4 (S540) by gathering each satellite image in which the two-dimensional interpolation is carried out, and stores it in the database 205 (S550).

Meanwhile, when the satellite image judgment unit distinguishes the satellite providing the satellite images, which are input and received, from the sensor of the satellite, and judges the satellite images provided from the sensor and the satellite providing non-missing satellite images, the satellite image composing unit may compose the non-corrected satellite image by gathering the plurality of satellite images divided according to the spectral information (S515) and may compose the database using the corrected satellite image and the non-corrected satellite image (S550).

Explaining it more specifically, when the satellite image judgment unit 201 judges satellite images obtained from the MSS (Multi Scanner System) of Landsat 1, 2 or 3, the satellite image composing unit 204 may compose a first non-corrected satellite image by gathering the plurality of satellite images divided according to each spectral information. When the satellite image judgment unit 201 judges satellite images obtained from the TM (Thematic Mapper) of Landsat 4 or 5, the satellite image composing unit 204 may compose a second non-corrected satellite image by gathering the plurality of satellite images divided according to each spectral information. When the satellite image judgment unit 201 judges non-missing satellite images obtained from Landsat 7 ETM+ (Enhanced Thematic Mapper Plus), the satellite image composing unit 204 may compose a third non-corrected satellite image by gathering the plurality of satellite images divided according to the spectral information.

At this time, it is preferable that the satellite image composing unit 204 stores each satellite image in the database 205 in a parameter file which is legible in ERDAS software after reading each satellite image with a Matlab program and storing it in a BIL format.

Thus, according to the present invention, there can be provided the method and system for the correction of optical satellite images, which is more improved by carrying out one-dimensional interpolation and two-dimensional interpolation with regard to the satellite images in which the pixels are missing, and which can more conveniently handle a large amount of satellite images using a satellite and sensor information of the satellite.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A method for the correction of an optical satellite image, the method comprising:
   a first step in which a satellite image judgment unit inputs and receives a plurality of satellite images divided according to spectral information and judges whether or not some area is a missing satellite image;
   a second step in which when the satellite image judgment unit judges that the some area is the missing satellite image, a first interpolation unit inputs and receives the plurality of satellite images, and carries out one-dimensional interpolation for each satellite image which is input and received;

a third step in which a second interpolation unit carries out two-dimensional interpolation for each satellite image in which the one-dimensional interpolation is carried out; and a fourth step in which a satellite image composing unit composes a corrected satellite image by gathering each satellite image in which the two-dimensional interpolation is carried out.

2. The method of claim 1, wherein the second step is performed in such a manner that the first interpolation unit carries out one-dimensional interpolation for a missing pixel using normal pixels on a Y-axis on the basis of the missing pixel in the satellite images which are input and received.

3. The method of claim 1, wherein the second step is performed in such a manner that the first interpolation unit carries out one-dimensional interpolation by carrying out cubic convolution targeting the normal pixels on the Y-axis on the basis of the missing pixel in the satellite images which are input and received, and calculating the missing pixel.

4. The method of claim 1, wherein the third step is performed in such a manner that the second interpolation unit carries out two-dimensional interpolation for the missing pixel using the normal pixels of a predetermined range on the basis of the missing pixel in the satellite images which are input and received.

5. The method of claim 4, wherein the third step is performed in such a manner that the second interpolation unit carries out two-dimensional interpolation by calculating an average targeting the normal pixels of the predetermined range on the basis of the missing pixel in the satellite images in which the one-dimensional interpolation is carried out, and calculating the missing pixel.

6. The method of claim 1, wherein the first step further comprises a step in which when the satellite image judgment unit distinguishes a satellite providing the satellite images, which are input and received, from a sensor of the satellite and judges satellite images provided from the sensor and the satellite providing non-missing satellite images, the satellite image composing unit composes a non-corrected satellites image by gathering the plurality of satellite images divided according to spectral information.

7. The method of claim 6, wherein the satellite sensor is composed of any one of a MSS (Multi Scanner System), a TM (Thematic Mapper), and ETM+(Enhanced Thematic Mapper Plus).

8. The method of claim 6, further comprising a step in which the satellite image composing unit composes a database using the corrected satellite image and the non-corrected satellite image, after the fourth step.

9. A system for the correction of satellite images, the system comprising:
a computer configured to implement:
a satellite image judgment function including inputting and receiving a plurality of satellite images divided according to spectral information and judging whether or not some area is a missing satellite image;
a first interpolation function including inputting and receiving the plurality of satellite images and carrying out one-dimensional interpolation for each satellite image which is input and received when the satellite image judgment function judges that the some area is the missing satellite image;
a second interpolation function including carrying out two-dimensional interpolation for each satellite image in which the one-dimensional interpolation is carried out; and
a satellite image composing function including composing a corrected satellite image by gathering each satellite image in which the two-dimensional interpolation is carried out.

10. The system of claim 9, wherein the first interpolation function includes carrying out one-dimensional interpolation for a missing pixel using normal pixels on a Y-axis on the basis of the missing pixel in the satellite images which are input and received.

11. The system of claim 10, wherein the first interpolation function includes carrying out one-dimensional interpolation by carrying out cubic convolution targeting the normal pixels on the Y-axis on the basis of the missing pixel in the satellite images, which are input and received, and calculating the missing pixel.

12. The system of claim 10, wherein the second interpolation function includes carrying out two-dimensional interpolation for the missing pixel using the normal pixels of a predetermined range on the basis of the missing pixel in the satellite images in which the one-dimensional interpolation is carried out.

13. The system of claim 12, wherein the second interpolation function includes carrying out two-dimensional interpolation by calculating an average targeting the normal pixels of the predetermined range on the basis of the missing pixel in the satellite images in which the one-dimensional interpolation is carried out, and calculating the missing pixel.

14. The system of claim 9, wherein the satellite image composing function includes composing a non-corrected satellite image by gathering the plurality of satellite images divided according to spectral information when the satellite image judgment function discriminates a satellite providing the satellite images, which are input and received, from a sensor of the satellite, and judging satellite images provided from the sensor and the satellite providing non-missing satellite images.

15. The system of claim 14, wherein the sensor of the satellite is composed of any one of a MSS (Multi Scanner System), a TM (Thematic Mapper), and ETM+(Enhanced Thematic Mapper Plus).

16. The system of claim 14, further comprising a database which stores the corrected satellite image and the non-corrected satellite image composed by the satellite image composing function.

\* \* \* \* \*